(12) United States Patent
Nowakowski

(10) Patent No.: US 7,197,614 B2
(45) Date of Patent: Mar. 27, 2007

(54) METHOD AND APPARATUS FOR MIRRORING DATA STORED IN A MASS STORAGE SYSTEM

(75) Inventor: Steven Edmund Nowakowski, Rochester, MN (US)

(73) Assignee: Xiotech Corporation, Eden Prairie, MN (US)

( * ) Notice: Subject to any disclaimer, the term of this patent is extended or adjusted under 35 U.S.C. 154(b) by 498 days.

(21) Appl. No.: 10/434,290

(22) Filed: May 7, 2003

(65) Prior Publication Data

US 2003/0212870 A1    Nov. 13, 2003

Related U.S. Application Data

(60) Provisional application No. 60/379,043, filed on May 8, 2002.

(51) Int. Cl.
   G06F 12/16    (2006.01)
   G06F 12/12    (2006.01)

(52) U.S. Cl. .................. 711/162; 711/135; 711/133; 714/5; 714/6

(58) Field of Classification Search ..................... None
See application file for complete search history.

(56) References Cited

U.S. PATENT DOCUMENTS

| 6,182,198 | B1 * | 1/2001 | Hubis et al. ................. 711/162 |
| 6,473,775 | B1 * | 10/2002 | Kusters et al. ............... 707/200 |
| 6,681,339 | B2 * | 1/2004 | McKean et al. ................ 714/5 |
| 6,931,487 | B2 * | 8/2005 | Lubbers et al. ............. 711/114 |
| 2002/0108017 | A1 * | 8/2002 | Kenchammana-Hoskote et al. .......................... 711/113 |
| 2003/0079083 | A1 * | 4/2003 | Lubbers et al. ............. 711/114 |
| 2003/0158999 | A1 * | 8/2003 | Hauck et al. ................ 711/113 |
| 2004/0128470 | A1 * | 7/2004 | Hetzler et al. ............... 711/209 |

* cited by examiner

*Primary Examiner*—B. James Peikari
(74) *Attorney, Agent, or Firm*—McDermott Will & Emery

(57) ABSTRACT

A method and apparatus for mirroring data stored in a storage device within a mass storage system by copying data stored in a first storage device to a second storage device, while simultaneously flushing the write cache. After the two storage devices are synchronized, the applications running on the server that is coupled to the storage devices are temporarily halted to insure that the data is coherent. To obtain coherency, residual data in the write cache may have to be written to both the first and second storage devices. Thereafter, the mirror is broken and the first storage device can begin to be used to store data and the second storage device can be used for other purposes such as facilitating a backup of the data. In this embodiment, since most, if not all, of the data in the write cache is flushed during the time that the first storage device is copied, execution of the applications is only halted for a very short time period.

20 Claims, 2 Drawing Sheets

METHOD AND APPARATUS FOR MIRRORING DATA STORED IN A MASS STORAGE SYSTEM

CROSS-REFERENCE TO RELATED APPLICATIONS

This application claims benefit of U.S. provisional patent application Ser. No. 60/379,043, filed May 8, 2002, which is herein incorporated by reference.

BACKGROUND OF THE INVENTION

1. Field of the Invention

The present invention generally relates to mass storage systems, and more particularly, to mass storage systems that store redundant data.

2. Description of the Related Art

Data storage systems are used within computer networks and systems to store large amounts of data that is used by multiple servers and client computers. Generally, one or more servers are connected to the storage system to supply data to and from a computer network. The data is transferred through the network to various users or clients. The data storage system generally comprises a controller that interacts with one or more storage devices such as one or more Winchester disk drives or other forms of data storage. To facilitate uninterrupted operation of the server as it reads and writes data from/to the storage system as well as executes applications for use by users, the storage system comprises a write cache that allows data from the server to be temporarily stored in the write cache prior to being written to a storage device. As such, the server can send data to the storage system and quickly be provided an acknowledgement that the storage system has stored the data. The acknowledgement is sent even though the storage system has only stored the data in the write cache and is waiting for an appropriate, convenient time to store the data in a storage device. As is well known in the art, storing data to a write cache is much faster than storing data directly to a disk drive. Consequently, the write cache buffers a large amount of data in anticipation of subsequently storing that data in a storage device.

To insure that a malfunction of the storage device does not render all of the data on the device useless, the data is generally backed up on a periodic basis. Various methods have been developed to "mirror" stored data to a second storage device such that an identical copy is made from one device to another. Because of the use of a write cache, data in both the write cache and the storage device to be mirrored must be correctly copied. As such, the process for mirroring a storage device can be complicated. In one method used in the art, all the application programs (hereinafter referred to as applications) that are executing on the server or servers are halted while the mirroring process is accomplished. During the mirroring process, the applications are halted to insure the data sent to the storage system is in a consistent state where the application could be restarted from this coherent image. Prior to copying data from the first storage device to the second storage device, the write cache must be flushed by writing all the information that is in the write cache to the first storage device. Once the cache is flushed, then a coherent image is stored on the first storage device. Next, the first storage device is completely copied to a second storage device or mirrored. After mirroring, the mirror is broken and the first storage device is then used again for data storage and the server begins executing applications. This mirroring process requires the applications to remain halted for a longer time and has fallen out of favor for a second type of mirroring process.

In a second mirroring process that is used in the art, the first storage device is copied to a second storage device as the first storage device is continuously used by the server to access data. A controller within the storage system uses the write cache to store data that will ultimately be stored in the first storage device while the copying function is being performed. Once the contents of the first storage device is copied to the second storage device, all the new data in the write cache is written to both the first and second storage devices. Alternatively, the controller may track what new data is written to the first storage device and simultaneously write the new data to the first storage device as well as the second storage device. After the first storage device is mirrored to the second storage device, the applications executing on the server are temporarily halted while the write cache within the storage system is flushed. During the flushing process, all the data that is in the write cache is written to both the first storage device and the second storage device such that, after the cache is flushed, the two storage devices are mirrors of each other. Once the cache is flushed, the storage system contains coherent copies of the data on the first and second devices. At this point, mirroring between the first and second storage devices is stopped ("breaking the mirror") and the first storage device is again used for storing data and the applications that were temporarily halted are now restarted. The second storage device can now be used for other functions with the knowledge that all of the data that was on the first storage device was mirrored to the second storage device at a specific instant in time. For example, the second storage device data may now be copied to a back up media and used for permanent or long term storage. Once the backup is complete, the second storage device can be used for another mirroring operation at a later time to facilitate periodic backups of the data on the first storage device.

The major disadvantage of this second method for performing mirroring is that all of the applications must remain halted while the write cache is flushed. Since, in a large mass storage system, the write cache can be on the order of multiple gigabits of data storage the time required to flush the cache can be extensive. Consequently, the server is not executing applications during the period when the cache is being flushed. This waiting time can be noticeable to users that are interacting with the server at the time a periodic backup or mirroring function is performed.

Therefore there is a need in the art for a method and apparatus that improves the mirroring task within a mass storage system.

SUMMARY OF THE INVENTION

The disadvantages associated with the prior art are overcome by a method and apparatus for mirroring data stored in a storage device within a mass storage system by copying data stored in a first storage device to a second storage device while simultaneously flushing the write cache. After the two storage devices are synchronized, the applications running on the server that is coupled to the storage devices are temporarily halted to insure that the data stored to the storage system is coherent. To obtain coherency on the storage devices, residual data in the write cache may have to be written to both the first and second storage devices. Thereafter, the mirror is broken. The first storage device can begin to be used to store data, and the second storage device can be used for other purposes such as facilitating a backup of the data. In this embodiment, since most, if not all, of the data in the write cache is flushed during the time that the first storage device is copied, execution of the applications is only halted for a very short time period.

In one embodiment, application data stored in the write cache after the applications have been halted is marked as old and only the old data that was in a write cache is flushed to both storage devices. The applications only need to be halted long enough to apply the old label to the cache data.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
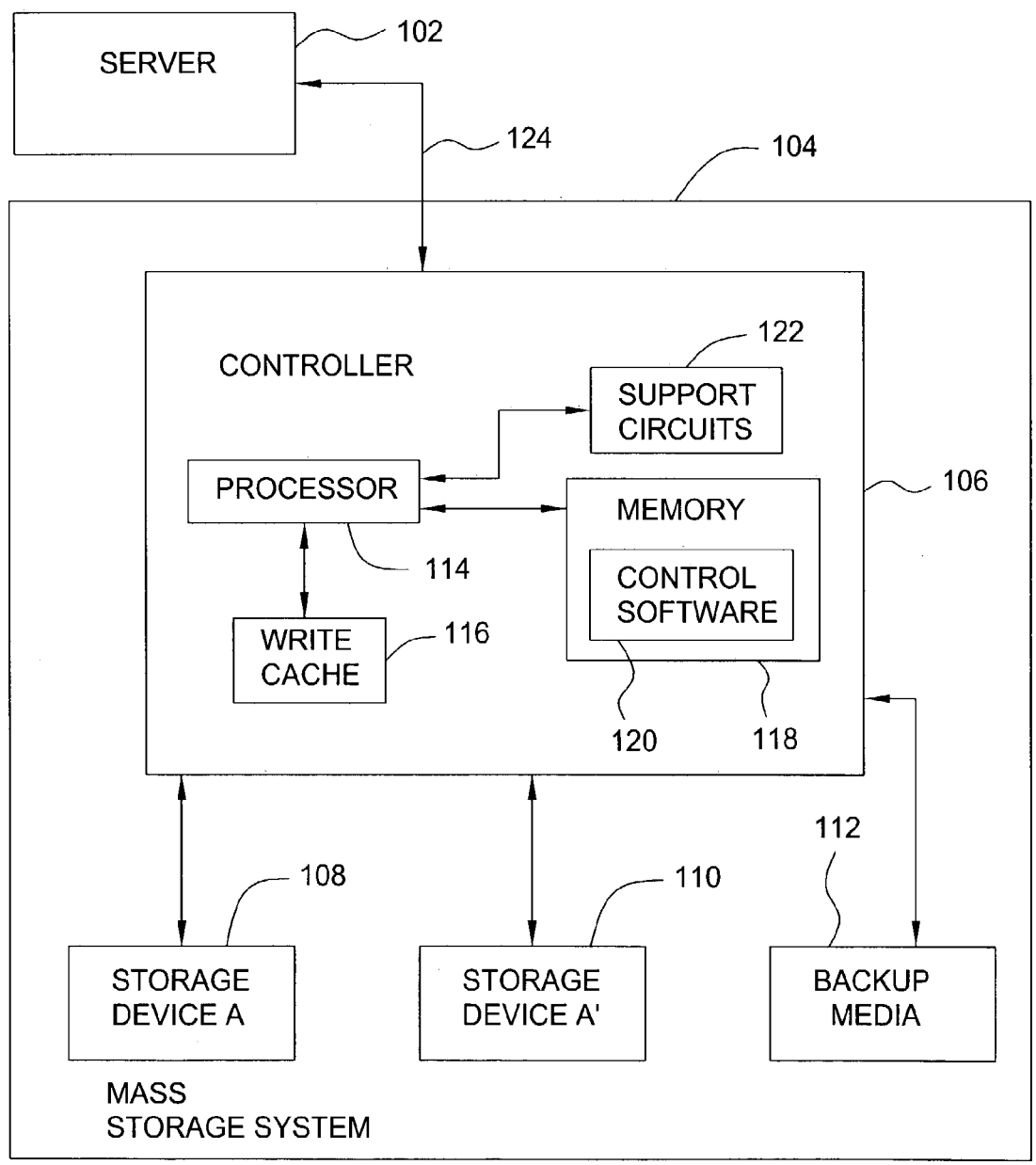
FIG. 1 depicts a simplified block diagram of a computer system comprising a mass storage system coupled to a server.

FIG. 1 depicts a computer system 100 comprising a server 102 coupled to a mass storage system 104. The server 102 may be one of many servers that are coupled to the mass storage system 104 through a network or other communications interface 124. The interface 124 couples command and control information as well as data from the server to and from the mass storage system 104. As such, data and commands for storing and retrieving data are sent from the server 102 along interface 124 to the mass storage system 104.

The mass storage system 104 comprises a controller 106, at least one storage device A 108, and an additional storage device A' 110 that is used for mirroring the data from storage device A 108. The storage devices 108, 110 may be any form of readable/writable storage for digital data such as Winchester disk drives, magneto-optical storage, and the like. Each storage device 108, 110 may include multiple physical storage devices that are arranged in arrays that may or may not comply with one or more of the various RAID standards.

The mass storage system 104 may also comprise a backup media 112, which may or may not be co-located with the mass storage system 104. In some instances, the backup media, for example a tape drive, may be located remotely from the mass storage system 104 and coupled to the mass storage system 104 via a network interface or coupled through the server 102.

The controller 106 of the mass storage system 104 comprises a processor 114, write cache 116, support circuits 122, and memory 118. The write cache 116 is used in a conventional manner by the processor to buffer data that is to be stored in the storage device 108 from the server 102. Memory 118 stores control software 120 that is executed by the processor 114 to perform the method of the present invention (see FIG. 2). The support circuits 122 comprise conventional, well-known circuitry such as clocks, cache, power supplies, input/output circuitry, and the like. The general structure and operation of the controller 106 is in accordance with known mass storage system controllers, except for the execution of software 120 that facilitates the mirroring of storage device A 108 to storage device A' 110 in accordance with the present invention.

Under normal operating conditions the server 102 provides a write command and data to the controller 106. The controller 106 stores the data in the write cache 116 while responding to the server's request for storage with an acknowledgement that the data has been stored. At a convenient time to the mass storage system 104, the controller 106 sends the data from the write cache to the storage device A 108 for storage. Over time and in response to demands for storage within the mass storage system, the write cache 116 contains a large amount of data to be written to the storage device A 108. To support the copying of the data within the storage device A 108 to an alternative media, the controller 106 periodically executes a software 120 within memory 118 to mirror the data within the storage device A 108 to storage device A' 110. Additionally, any data that is stored in the write cache 116 at the time of the mirroring process must also be written to storage device A 108 as well as storage device A' 110. The execution of the mirroring software 120 may be initiated by at least one of the server 102 or the controller 106. At the point when the write cache 116 as well as all the information in storage device A 108 is stored in storage device A' 110, the storage devices 108 and 110 are said to be synchronized.

Figure 2:
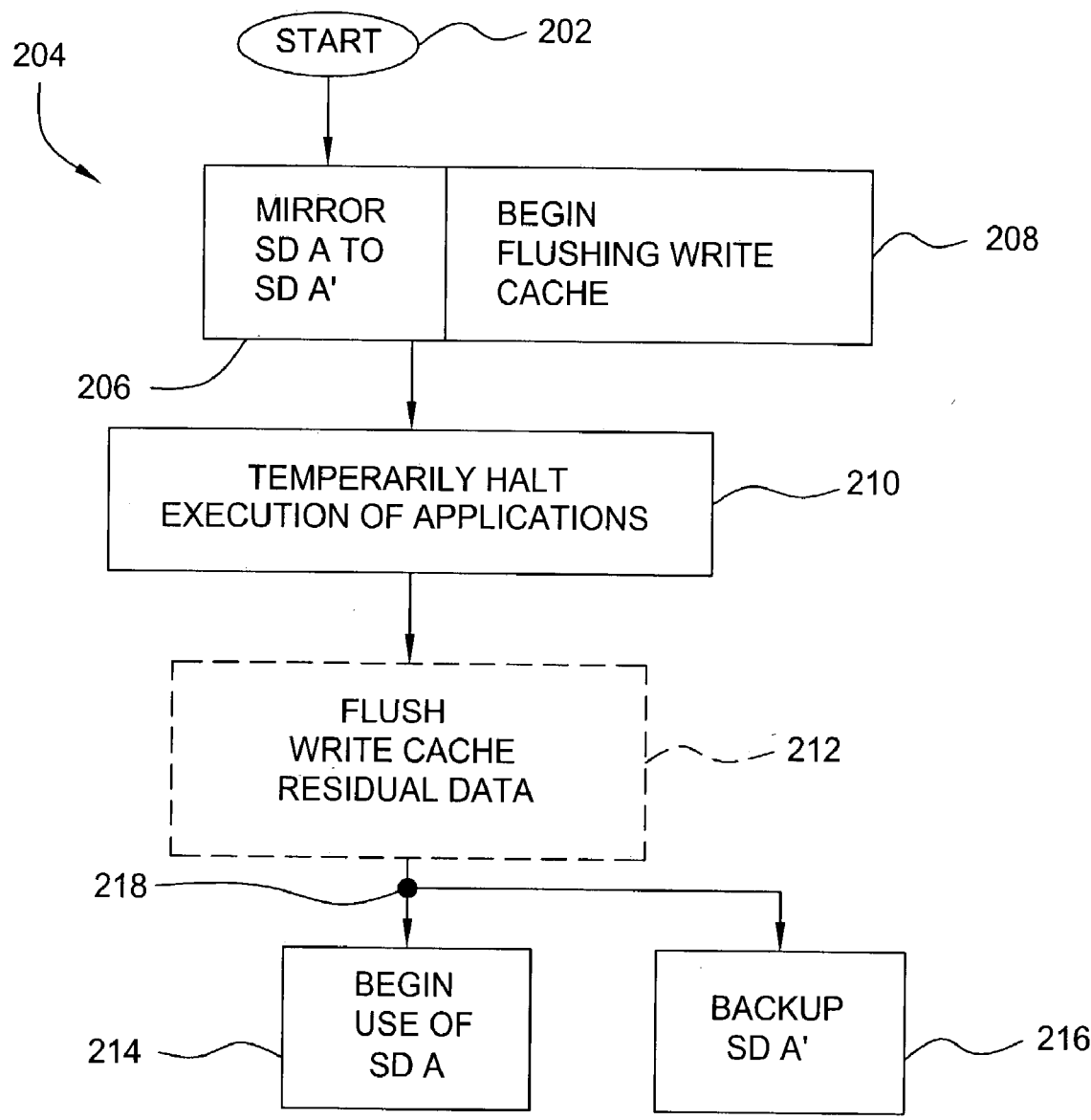
FIG. 2 depicts a flow diagram of a process of the present invention as performed by the computer system of FIG. 1.

FIG. 2 depicts a process 200 of operation for the mass storage system 104 in accordance with one embodiment of the present invention. The process 200 begins at step 202, which is typically periodically executed to ensure a periodic backup of the storage device A 108 is produced. At step 204, data currently stored within storage device A 108 is mirrored to storage device A' 110 by copying the data sector by sector. Typically, the storage devices are Winchester disk drives that are addressed by sector or block. Each sector or block is copied from one drive to another. Simultaneously with execution of mirroring substep 206, the write cache 116 is flushed at substep 208.

Flushing of the cache 116 may be performed by a number of techniques. The simplest technique that ensures that the cache is flushed such that no further data is stored in the cache upon completion of the mirroring process is to block all new data writes to the write cache 116. Typically, ceasing all cache use impacts the processing speed of the server 102. Specifically, the server 102 will have to wait for an acknowledgement from the mass storage system for the data to actually be stored within the storage device A 108, rather than just written quickly to the write cache 116. If the reduction in processing speed is acceptable, no further data will be stored in the write cache ensuring that at the end of the mirroring process of substep 206, the write cache will be empty. As such, at the end of the mirroring process, there will be no delay while the write cache is flushed.

If, on the other hand, the reduction in performance of the server 102 by not being able to use the write cache 116 is substantial, the new writes should not be stopped completely. As such, the new writes to the cache 116 can be minimized and the write cache can be placed in "max flush" mode, which enables the write cache to write data to the storage devices more often than typical. In most cache designs the data is held in cache for a time and flushed based on an algorithm intended to minimize the number of writes to the storage device and maximize the size of the writes for greater efficiency. In "max flush" mode the algorithm would be reprioritized to empty the cache as quickly as possible even at a loss of efficiency.

As data is stored in the storage device A 108, the controller 106 tracks this information to ensure that the new data written to storage device A 108 is also written to storage device A' 110 to ensure that mirroring is accomplished while simultaneously using the storage devices 108 and 110. Once the mirroring is completed and all of the sectors of storage device A 108 are copied to storage device A' 110, the method 200 temporarily halts the execution of applications on the server 102. This is accomplished by the controller 106 sending a "mirror complete" message through the interface 124 to the server 102. The server 102 then halts the application and sends a command to the controller 106 to "break the mirror". Breaking the mirror is defined as halting the writes to the secondary storage device A' 110 and only continuing writes to the primary storage device A 108. That is, the secondary storage device A' 108 no longer receives any updates.

At this point, if no data exists in the write cache, then storage device A 108 and storage device A' 110 are now synchronized and contain the coherent data image from the application. The server 102 will restart the applications when the controller 106 sends a completion message following the break the mirror command.

However, if the write cache was used during the mirroring process, the residual data that is stored in the write cache is flushed at step 212. Ideally the flushing process of substep 208 should coincide with the mirroring process of substep 206 such that even the residual data will be flushed from the cache simultaneously with the mirroring process of substep 206 completing. As such, the delay associated with flushing the residual data from the cache is avoided and step 212 becomes unnecessary. By simultaneously performing the write cache flush and the mirroring process, the time allocated to step 212 can be minimized or eliminated. Consequently, the temporary halt in execution of the applications is substantially shortened over that which is used by the prior art. One skilled in the art will appreciate that the time taken to flush the cache depends on the workload and performance of the storage sub system 104.

Alternatively, the controller 106 may utilize the write cache normally during the mirroring process by marking which data must be committed to both storage devices. When the "mirror is complete" message is sent to the server, the server 102 halts the application and sends a command to the controller 106 to "break the mirror". The controller 106 will mark the data in the write cache at the that time as "old" data to be written to both storage devices. As soon as the data is marked, the acknowledgement can be sent to the server 102 and the applications restarted. The storage system stops mirroring and "old" data is flushed to both storage devices. Any "new" data in the cache is written only to storage A 108. The time to mark the data is substantially less than the time to flush the data to the storage devices greatly reducing the time the applications must be halted.

Preferably, the controller 106 adjusts the rate of flushing of the "old" write cache data such that the "old" write cache data is completely flushed by the time all the data on storage device A 108 has been copied to storage device A' 110. When the mirror is then broken, there is no further "old" data to be flushed to the storage devices. This minimizes the time applications are halted during the mirror break because the write cache is completely flushed of "old". After the mirror is broken, normal cache operations are resumed and the "new" data is written only to storage device A 108.

Upon synchronization and coherency being obtained at point 218, the mirror is broken and the storage device A 108 is used at step 214 to store data from the server once again in a conventional manner. The storage device A' 110 may be used for other purposes such as the backup of the data from storage device A. At point 218, it is known that the storage device A 108 and storage device A' 110 are synchronized and contain identical data from which a backup can be generated or the data can be used for other purposes. The method 200 is periodically performed to ensure that the data contained in storage device A 108 is made redundant on storage device A' 110 such that an error or malfunction in storage device A 108 will not destroy or render useless all of the data that is stored in storage device A 108.

While foregoing is directed to the preferred embodiment of the present invention, other and further embodiments of the invention may be devised without departing from the basic scope thereof, and the scope thereof is determined by the claims that follow.

What is claimed is:

1. A method of mirroring a storage device comprising:
   copying data stored on a first storage device to a second storage device, while simultaneously flushing a write cache to both the first and second storage devices;
   temporarily halting execution of application programs after the data stored in the first storage device is copied to the second storage device;
   halting writes to the second storage device; and
   restarting execution of application programs to use the first storage device to store data.

2. The method of claim 1 wherein first and second storage devices comprise disk drives.

3. The method of claim 1 further comprising continuing to use the write cache to store application program data during the copying and flushing steps.

4. The method of claim 3 further comprising marking data received from application programs in the write cache before the break mirror as "old" and flushing only "old" write cache data that was received prior the break mirror to both storage devices.

5. The method of claim 3 further comprising adjusting the rate of flushing of the write cache so that substantially all of the write cache is flushed at the time of halting execution of the application program such that the time for flushing any residual data from the write cache is minimized.

6. The method of claim 1 further comprising completing the flushing of the write cache after halting execution of the application programs.

7. The method of claim 1 further comprising, during the copying step, halting all use of the write cache.

8. The method of claim 1 further comprising, during the copying step, minimizing the use of the write cache.

9. Apparatus for mirroring a storage device that is used by an application program to store data comprising:
   means for copying data stored by the application program in a first storage device to a second storage device, while simultaneously flushing a write cache;
   means for temporarily halting execution of the application program after the data stored in the first storage device is copied to the second storage device;
   means for halting writes to the second storage device, and
   means for restarting execution of the application program to use the first storage device to store data.

10. Apparatus according to claim 9 wherein first and second storage devices comprise disk drives.

11. Apparatus according to claim 9 further comprising means for continuing to use the write cache to store application program data during copying and flushing.

12. Apparatus according to claim 11 further comprising means for marking data received from application programs before the break mirror as "old"; and further comprising means for flushing only old write cache data that was received prior the break mirror to both storage devices.

13. Apparatus according to claim 1 wherein the means for copying is further configured to adjust the rate of flushing of the write cache so that substantially all of the write cache is flushed at the time of halting execution of the application program such that the time for flushing any residual data from the write cache is minimized.

14. Apparatus according to claim 9 further comprising means for completing the flushing of the write cache after halting execution of the application programs.

15. Apparatus according to claim 9 wherein the means for copying further comprises means for halting all use of the write cache during copying.

16. Apparatus according to claim 9 wherein the means for copying further comprises means for minimizing the use of the write cache during copying.

17. A computer readable medium comprising software that, when executed by a computer processor, causes a computer system comprising a mass storage system to perform a method of mirroring a storage device, said method comprising:

copying data stored on a first storage device to a second storage device, while simultaneously flushing a write cache to both the first and second storage devices;

temporarily halting execution of application programs after the data stored in the first storage device is copied to the second storage device;

halting writes to the second storage device; and restarting execution of application programs to use the first storage device to store data.

18. The computer readable medium of claim 17, further comprising, using the second storage device as a source of data for a backup media.

19. The computer readable medium of claim 17 further comprising, during the copying step, halting all use of the write cache.

20. The computer readable medium of claim 17 further comprising, during the copying step, minimizing the use of the write cache.

* * * * *